United States Patent [19]
Gooding

[11] 3,919,695
[45] Nov. 11, 1975

[54] ASYNCHRONOUS CLOCKING APPARATUS

[75] Inventor: David N. Gooding, Endicott, N.Y.

[73] Assignee: International Business Machines Corporation, Armonk, N.Y.

[22] Filed: Dec. 26, 1973

[21] Appl. No.: 428,555

[52] U.S. Cl. .............................................. 340/172.5
[51] Int. Cl.² .......................................... G06F 15/16
[58] Field of Search .............. 340/172.5; 179/18 AL

[56] References Cited

UNITED STATES PATENTS

| | | | |
|---|---|---|---|
| 3,546,680 | 12/1970 | Bahrs et al. | 340/172.5 |
| 3,577,128 | 5/1971 | Criscimagna et al. | 340/172.5 |
| 3,613,088 | 10/1971 | Brendzel | 340/172.5 |
| 3,671,942 | 6/1972 | Knollman et al. | 340/172.5 |
| 3,715,729 | 2/1973 | Mercy | 340/172.5 |
| 3,757,308 | 9/1973 | Fosdick | 340/172.5 |
| 3,761,884 | 9/1973 | Avsan et al. | 340/172.5 |

*Primary Examiner*—Gareth D. Shaw
*Assistant Examiner*—Michael C. Sachs
*Attorney, Agent, or Firm*—Kenneth P. Johnson

[57] ABSTRACT

Clocking apparatus for complex and extensive data processing systems in which the functional logic circuit units are each provided with individual clocking circuits and the several clocking circuits are activated by a central control unit. Operation of the individual clock circuits is initiated by control unit signals and each clock circuit operates at an independent rate. The clocking system is readily adaptable to computer systems using large scale integration (LSI) since the clock circuits can be made a portion of each LSI chip and operated to control the functional logic circuits on that chip. At the conclusion of a functional cycle, a completion signal is transmitted to the central control unit which can then generate additional clock initiation signals as required. The clock circuits also include additional delay circuits which can be activated to add predetermined amounts of delay between selected clock output signals to permit remotely adapting the clock timing control to the requirements of a functional logic unit.

16 Claims, 6 Drawing Figures

ASYNCHRONOUS CLOCKING APPARATUS

BACKGROUND OF THE INVENTION

As the data processing time in digital computers is reduced by the use of higher speed circuits, as is possible with large scale integration, signal propogation time becomes extremely critical and signal delay during transmission must be known and accounted for in circuit design. When functional circuit units, such as integrated circuit chips, each having hundreds of circuits thereon, are assembled together to form a data processor, the path length for signals between circuit chips accounts for a large portion of the signal propogation time, counteracting time savings made possible by the large scale integration.

In the past, coordination of the individual functional units was accomplished by providing a master clock and distributing the clock pulses to each functional unit or chip. When distribution paths become lengthy, the clocking pulses encountered varying transmission delays, depending upon the length of the signal path. Thus, corrections were usually made at each functional unit to adjust the signal timing by inserting delays in the signal paths to allow synchronous operation of several functional units. This type of clocking has the inherent problems of variable signal strength, skew and distortion.

Another difficulty in maintaining synchronization of functional units was that varying circuit characteristics would be encountered on individual circuit chips. Components did not have identical operating characteristics and, in the case of large scale integration, there were differences in propogation delays and switching speeds among the chips. Each chip may contain a large portion of the critical logic path and therefore random variations of circuit parameters cannot be counted on to average out the individual circuit delay. Consequently, a large safety factor would have to be added to the worst path times to insure chip compatibility with the processing system.

It is accordingly a primary object of this invention to provide an improved clocking system which can readily accommodate variations in signal propagation and circuit performance times and in which functional logic units can be asynchronously operated.

Another object of this invention is to provide a distributed clocking control in which a central control unit merely initiates clocking signal operation without the necessity of transmitting clocking pulses.

A further object of this invention is to provide a distributed clocking system in which each functional logic unit has its own clocking circuit so that the clocking circuit possesses the same performance characteristics that the remaining circuits of the unit possesses.

A still further object of this invention is to provide a distributed clocking system having a plurality of independent clocking circuits within functional units and in which an adjustable delay can be inserted between selected clocking signals to thereby vary the clock cycle to conform to the requirement of the functional logic unit.

SUMMARY OF THE INVENTION

The foregoing objects are attained in accordance with the invention by providing an independent clock for each functional logic unit that the system may require and using a central control unit to initiate operation of the independent clocks. The individual clocks are formed with a first plurality of logic circuits, such as plurality of bi-stable devices, and include a second plurality of cascaded logic circuits from which delay signals can be taken as desired to insert between successive clock output signals of the first plurality of logic circuits and thereby vary the clock times. The variable delay can be selected merely by changing the signal level on an input line to the functional unit. Upon concluding an operation at the functional unit, a completion signal is transmitted to the central control unit which thereafter can transmit another clock initiation signal to the reporting unit or to other functional units.

The clock disclosed with programmable delay uses a plurality of Nand latches to provide logic timing circuits and a second plurality of serially arranged Invert circuits for the programmable dealy. The sequencing of the latches provides the basic timing pulses from which the functional logic is controlled. The programmable delay logic controls the speed at which the sequence of timing signals occurs and thus the relative timing of the clock cycle. The clock circuit also has the facility of being able to be cut short by the addition of auxiliary input/output signal line to the unit.

The invention provides the primary advantage of eliminating the distribution of clock pulses to remote functional units. Since the clock circuit is included with each functional unit, it will have the same characteristics as the operational logic which are dictated by materials and manufacturing processes. In addition, by having auxiliary circuits within the clock and providing a cascaded delay logic, it is convenient to select a clocking signal delay that matches the time required for the functional unit circuits.

When the clock circuit is included with the functional unit, there is also the convenience of being able to change a functional unit as to type of circuit technology since the clock and its programmable delay require few external control signals and hence a minimum of difficulty is encountered in attaining signal compatibility. Independent clocks further permit the individual cycling of functional units in the event of troubleshooting or testing. Since clock operation can be terminated at the generation of a completion signal, it is possible to include error checking circuits within a functional unit which are also timed with the build-in clock. In the event an error is detected, the central control module is able to repeat the same initiation command for retry to determine the existence of an error. The basic machine cycle is no longer dictated by the worst case of the critical path of the data flow, but by the worst case path of the current instruction being executed and the cycle time of the control store memory for a microprogrammed machine. It is also possible to lengthen the machine cycle when a shared facility such as a local store has been pre-empted by another program.

Although the provision of individual clocks requires space within each functional unit, it is generally approximately 5% of the chip. The advantages outweigh the disadvantages by far becuase of the "tracking" with the logic, and the elimination of the necessity for race-producing "toggle" or "strobe" pulses to change states.

The foregoing and other objects, features and advantages of the invention will be apparent from the following more particular description of a preferred embodiment of the invention as illustrated in the accompanying drawings.

DESCRIPTION OF PREFERRED EMBODIMENT

Figure 1:
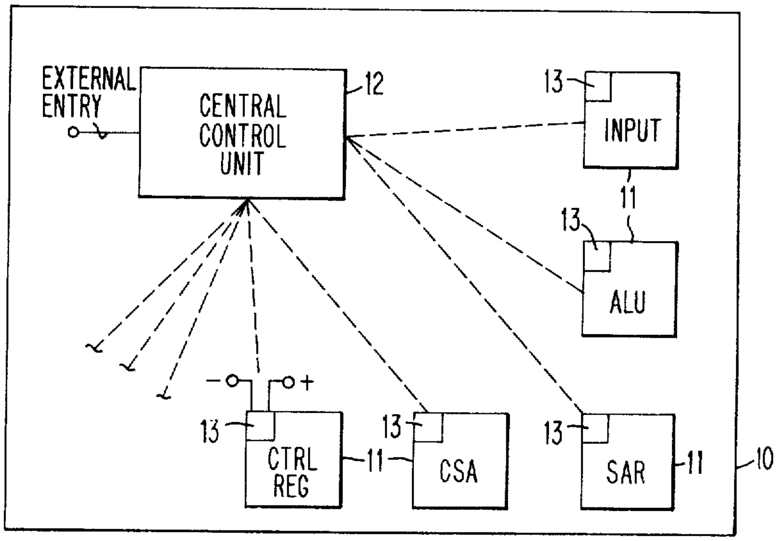
FIG. 1 is a schematic diagram of a data processing system showing a central control unit and a plurality of remote functional logic units, each having an independent clocking circuit in accordance with the invention.

In FIG. 1 there is shown a schematic illustration of a data processing system 10 in which the invention can be incorporated. This processor is composed of a plurality of functional logic units 11, of which only some of the more usual units are shown, and a central control unit 12 which communicates with each of the logic units. Examples of some functional units 11 are Data Input (Input), Arithmetic Logic Unit (ALU), Storage Address Register (SAR), Control Storage Address (CSA), and Control Register (CTRL REG.). Other units may also be required.

With the present day technology and capability for constructing miniature circuits and components, each of the units 11 would probably comprise circuit chips manufactured by large scale integration (LSI) techniques, as would central control unit 12. Processor 10 may comprise a single module of several functional unit chips and control unit chip or multiple modules. One functional unit 11 may also require a plurality of circuit chips, but be packaged so that circuit connections between chips are of minimum length.

In the usual system, a control unit 12 contains a clocking circuit producing regularly timed pulses which are transmitted to each of the functional units 11 to maintain synchronization among the units. However, with relatively long signal paths in some instances, there is considerable difference in the transmission time of the parallel timing signals and steps have to be taken to insert equalizing delay in the faster transmission lines. A further difficulty is encountered because of the differences in circuit characteristics of each functional unit. Although the logic units or chips 11 may be subjected to the same sequence of manufacturing processing steps, there are significant differences in the performance characteristics because of variations in materials, processing time or temperature. Hence, one LSI chip will not possess the same performance capabilities as an adjacent one.

The present invention overcomes these problems by incorporating a clocking circuit 13 within each functional unit or on each chip. The several clocking circuits 13 are controlled by central control unit 12 of the module with a minimum of communication between control unit and functional units. Clocks in the remote units are started with an initiation signal such as a DO signal and only selected units 11 may be activated at some particular step in the program. Upon completion of the functional units controlled by the clocks thereon, completion or DONE signals are generated and returned to the control unit. This permits the control unit to move to the next step in the program and initiate succeeding DO signals. Clock circuits 13 are manufactured at the same time and under the same conditions as the functional logic circuits on the chip and, hence, will have approximately the same operating characteristics. However, if functional units vary as to operating characteristics, the clock circuits should preferably have the capability of being altered as to the rate at which its output timing signals are generated. This facility can be readily incorporated in the clock circuits.

Figure 2:
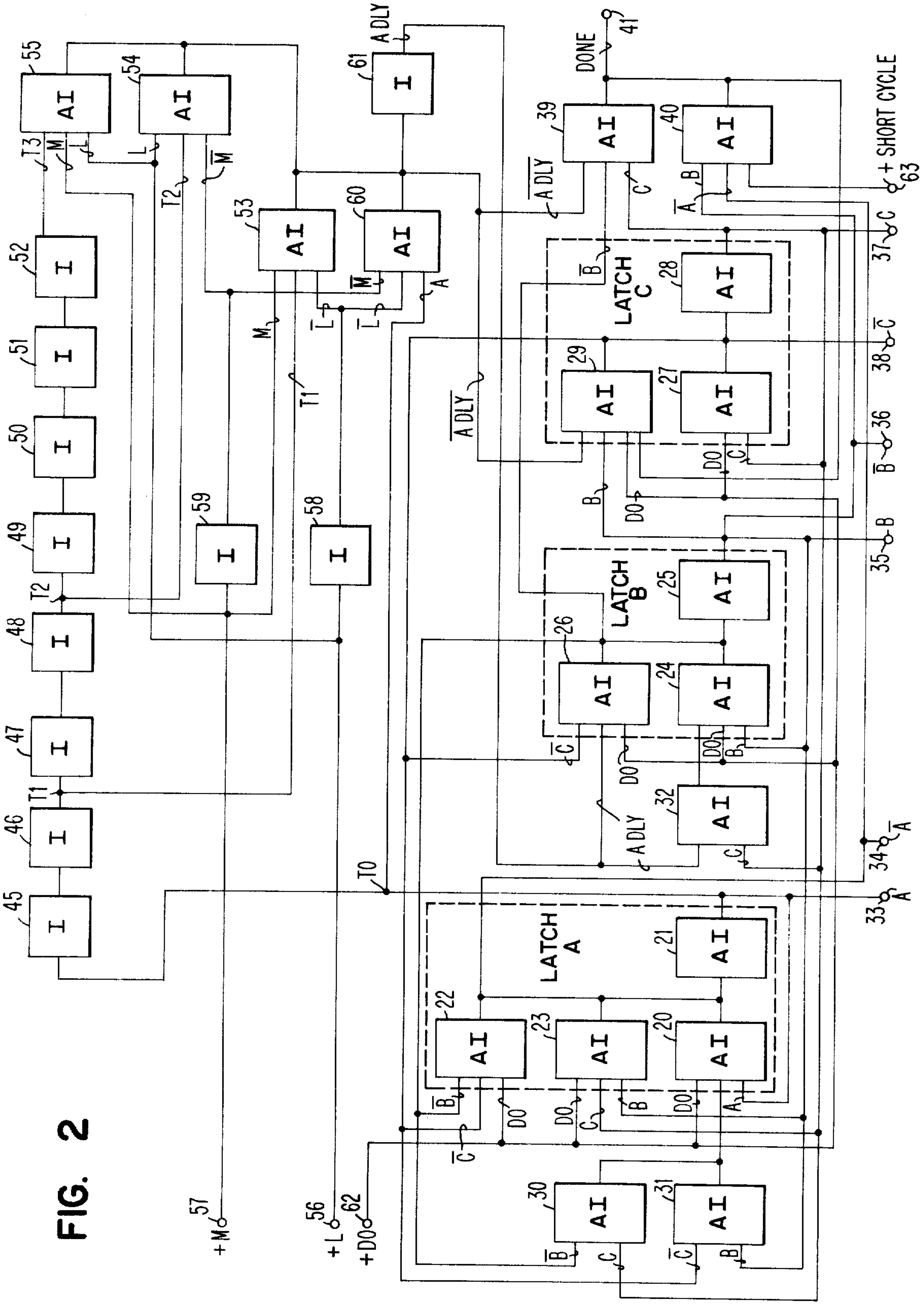
FIG. 2 is a circuit diagram of a remote clock having programmable delay therein constructed in accordance with the invention.

Referring to FIG. 2, there is shown one embodiment of a clocking circuit which may be incorporated with a functional unit or chip. This circuit can provide a combination of eight sequential output clocking signals and includes auxiliary circuits by which variable delay can be inserted between selected output signals as mentioned above. The clocking circuit of FIG. 2 uses conventional AND INVERT (AI) logic circuits and Invert (I) circuits. The AND Invert circuits, when serving as coincidence gates, require the presence of input signals of the same level before producing an output signal of the opposite level. For example, a two way coincidence circuit will require the presence of two positive level input signals before responding with a negative or low level output signal. If one or both of the input signals is a negative level, however, the output will be positive or high.

The clocking circuit comprises generally three polarity hold latches and their coincidence set gates and are designated respectively latch A, latch B, and latch C. Latch A includes AND Invert (AI) circuits 20 and 21 for the latch proper and coincidence set gates 22 and 23. Latch B includes AI circuits 24 and 25 for the latch proper and coincidence set circuit 26, while latch C includes AI circuits 27, 28 and coincidence set gate 29.

Each of the latches can be reset by an appropriate signal to its respective AI circuit, 20, 24, and 27. Latch A can be reset under several conditions and includes two additional reset gates 30 and 31, commonly connected as one input to latch circuit 20. Latch B has a single additional AI circuit 32 for an additional reset condition.

Clocking signals for appropriately controlling the functional unit circuits are taken from the terminals 33–38 along the bottom of the figure, each labeled with the appropriate latch output signal. In this circuit, a signal is present when the output terminal is at the high or positive level. To the right of the figure are a pair of AI coincidence circuits 39 and 40 which can each produce a completion or DONE signal at the conslusion of a clocking cycle under predetermined conditions at terminal 41.

The upper portion of the figure shows a series of eight serially connected or cascased Invert circuits 45–52. The input signal to the left of circuit 45 will be inverted at each of these circuits after a predetermined time as required by the circuit to produce the change in output signal level. The cascaded circuits operate as a delay line for input signals. By knowing the time required for each circuit to respond, output signals may be taken at points along the series for use as delay control signals elsewhere in the clocking circuit. It will be noted in the figure that outputs are taken for time T0 at the input of circuit 45, for time T1 at the output of circuit 46, for time T2 the output of circuit 48, and for time T3 from the output of circuit 52. These timing signals are fed to respective AI coincidence circuit gates 60, 53 54 and 55. The gates are conditioned by remotely operated control signals L and M, selectively applied at respective terminals 56 and 57. The signals are converted to complementary levels through respective inverters 58 and 59. Invert circuit 61 provides a complementary output for AI circuits 60, 53, 54 and 55.

Figure 3:
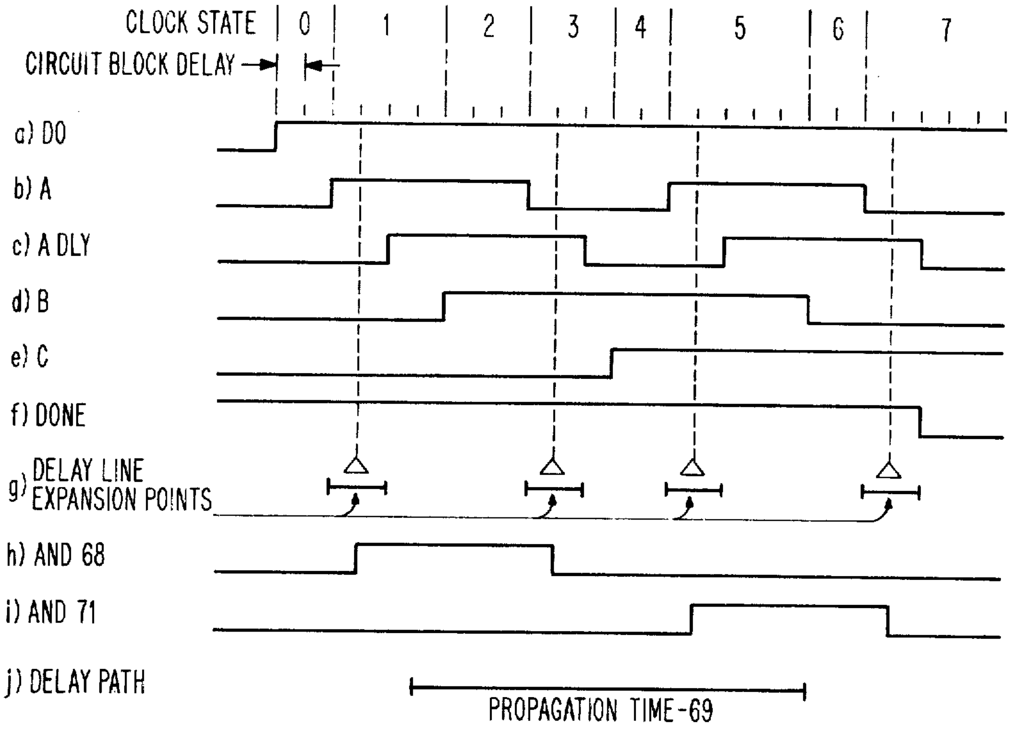
FIG. 3 is a timing diagram for the clock circuit shown in FIGS. 2 and 4.

The operation of the clocking circuit will now be described in conjunction with the timing diagram of FIG. 3. At this point, it is assumed that all latches are reset and that no L and M input signals exist at terminals 56, 57. Activativing input signals will be considered present when the line is at a high or positive level for the coincidence gates. The input signals required at each coincidence circuit are labeled, and signals indicated such as $\overline{B}$ are intended to mean the required presence of a positive level, and the complement of that signal. The inherent delay with a component circuit between an input signal and the output or response thereto is used in the clocking circuit to provide the sequence of time-spaced clock signals required. Each AI or Invert circuit requires a reaction time that is approximately known by a designer and the necessary circuits can be serially connected to provide the required total time between signals.

To initiate clock operation, a DO signal is received at terminal 62 from central control unit 12 (FIG. 1) which is supplied to each of the setting coincidence gates 22, 23, 26 and 29. This control signal must be present when any of the latches are set and, if all latches are reset, will serve as an initiating signal to start the clock. Such a condition may be assumed at gate 22 where the DO signal, in conjunction with the signals indicating the reset conditions of latches B and C, will fully condition the gate to thereby provide a negative output signal to AI circut 21 which in turn provides a positive output back to AI circuit 20 to hold the latch in the set condition. As seen in waveforms FIG. 3*a* and 3*b*, latch A goes positive at its output terminal 33 a predetermined time after the DO signal went positive. It will be seen from FIG. 2 that the DO signal was required to produce an output signal from circuit 22 whose output was required to serve as an input to circuit 21 which, in turn, would provide the latch output signal. Thus, two circuit blocks were required to react in succession. If each circuit block needed a certain reaction time, such as 2 nanoseconds (ns), then the delay as seen in FIG. 3 would amount to approximately 4 ns. Units of circuit delay are noted along the DO signal in FIG. 3 by short vertical marks.

When latch circuit 21 went positive, its signal was supplied to inverter circuit 45 and gate circuit 60. The change in the signal level at inverter circuit 45 causes a series of alternate negative and positive output signals throughout the series of inverters. The signals can be picked off at desired times by tapping the connecting lines at points such as T1, T2 or T3, as may be desired. However, in the present example no L and M signals are considered present at terminals 56 and 57 so that the successive signals T1, T2, and T3 are blocked from use and circuit 60 is conditioned to accept the minimum delayed signal to form latch A.

When the output of latch A went positive, it was applied to fully condition AI circuit 60 whose negative output is an input to inverter 61. The output signal from inverter 61, identified as A DLY (latch A output delayed) is supplied as an input to set gate 26 of latch B. The A DLY signal is so labeled because it has been delayed the predetermined amount of time required for the positive signal to be generated after the actuating signal is first applied through gate 60 and inverter circuit 61. This delay can be seen in FIG. 3*c* as compared to the occurrence of latch A going positive in FIG. 3*b*. The A DLY signal fully conditions gate circuit 26 to apply a negative input signal to circuit 25 which sets latch B so that a positive output will then appear at terminal 35, latch B turns on as seen in FIG. 3*d* two units of delay after the occurrence of the A DLY signal.

The positive output from latch B is applied as a conditioning output to set gate 29 for latch C. However, the $\overline{\text{A DLY}}$ is not present so the gate is not switched. The output of latch B is also applied as a conditioning input to set gate 23 of latch A and as an input to reset gate circuit 31 for latch A. Since latch C is not on, gate 23 is not fully conditioned but gate 31 is and a negative going reset signal is applied as input to gate circuit 20 of latch A. Circuit 20 thus provides a positive output and circuit 21 a negative output thereafter. It will be seen in FIG. 3*b* that the output of latch A goes negative three time units after latch B turned on due to the signal progression through circuits 31, 20 and 21. When latch A is reset, its output signal is reflected at gate 60 which in turn provides a positive output on the $\overline{\text{A DLY}}$ line to fully condition set circuit 29 for latch C.

Circuit 29 sets the latch so that a positive output appears at terminal 37.

From FIG. 3*e*, it will be seen that latch C is set 3 time units after latch A was reset because of circuit blocks 60, 29 and 28 requiring reaction time. The output signal from latch C is applied as a conditioning input to gate 39 which is not yet fully conditioned, and is applied as a partially conditioning input to reset gate 32 for latch B, also not fully conditioned. In addition, the latch C output is applied to set gate 23 for latch A and reset gate 30 for latch A. The reset gate 30 is not fully conditioned as latch B is still on but gate 23 is fully conditioned to set latch A again. Thus, after latch C is set, two time units are required to turn latch A on. Latch B is not turned off until five time units later, since its reset gate requires an A DLY signal generated through circuits 60 and 61 and thereafter the time required for three circuits 32, 24 and 25. This can be seen in FIG. 3*d*. After the latch B resets, reset gate 30 for latch A becomes fully conditioned and latch A is then reset. This occurs three time units after latch B reset as seen in FIG. 3*b* and 3*d*. As the output of latch A goes negative, the input to circuit 60, the positive $\overline{\text{A DLY}}$ goes positive to fully condition circuit 39 and generate a DONE signal at terminal 41 as seen in FIG. 3*f*. The DONE signal is transmitted to the central control unit 12 (FIG. 1) which is effective to bring down the level of the DO signal at terminal 62 so that the clock circuit is inoperable.

Clocking signals for the circuits in a functional logic unit can be taken from the various terminals 33–38. However, it may be desirable in certain instances to provide longer delay between the selected output signals. This can be done with the circuit of FIG. 2 by using the cascaded inverters 45–52. That source of the signal delay depends upon the actuation of input signals L and M at terminals 56 and 57. The signals may be present singly or together and a different amount of delay is inserted between the operation of latch A and the latch A DLY signal of FIG. 3 as indicated at FIG. 3*g*. Thus, in the sequence described above there are four points at which delay may be entered in the circuit.

It will be recalled that when latch A is set, it provides a positive output signal which is applied to Inverter circuit 45 causing alternating negative and positive output signals along the series of circuits. For instance, when circuit 45 has a positive input level, then points T1 and T2 and T3 will be positive as their respective inverters are turned on. For example, if a positive level from a remote control point is applied at terminal M, that level will condition coincidence gate 53 and when point T1 goes positive after two units of delay through circuits 45 and 46, the coincidence gate 53 will be fully conditioned to apply a negative output to Inverter 61 which produces the A DLY signal.

The four possible level combinations of terminals L and M will produce mutually exclusive conditioned gating of gates 53, 54, 55 and 60. Therefore, the presence of a positive level at terminal M and a negative level at terminal L will condition gate 53 and block gates 54, 55 and 60. Thus, when T1 is used to generate the A DLY signal, two additional units of circuit delay are inserted before Inverter 61 provides a positive output signal. If a positive signal is applied to the L terminal 56 and not the M terminal, gate 54 is fully conditioned. When the delay pulse sequence becomes positive at time T2, coincidence gates 53, 55, and 60 are each blocked so that inverter 61 receives its input signal after four units of delay. In the case when both signals L and M are present, then coincidence gate 55 is conditioned and gates 53, 54 and 60 are blocked. At time T3 or at the conclusion of a signal propogating inverters 45–52, gate 55 will provide a negative signal to inverter 61 thus producing a total of ten units of delay between the setting of latch A and the generation of the A DLY signals.

The delay produced by Inverters 45–52 is also effective to lengthen the response time to set latch C and to condition DONE gate 39, since both of these circuits rely on the complement of a DLY signal and a positive $\overline{\text{A DLY}}$ will appear between circuits 60 and 61. Thus, the clocking circuit can be varied as to cycle time merely by selecting the combination of two auxiliary control lines L and M. In most timing situations, the selection of one or the other of these signal lines will provide the necessary clocking delay. Of course, the circuit can be prearranged to provide delay between other latches if desired.

Provision is also made in the clock circuit for shortening the cycle time as may be desirable with certain functional logic units. This control requires an additional input to the clock portion of the chip at terminal 63. In the circuit shown, coincidence gate 40 will have conditioning signals on two of the inputs when latch B is on and when latch A is off. When a third input indicating a Short Cycle is applied at terminal 63, gate 40 will become fully conditioned and provide a termination or DONE signal at terminal 41. The output of circuit 40 is fed back to circuit 29 to inhibit the setting of Latch C.

Figure 4:
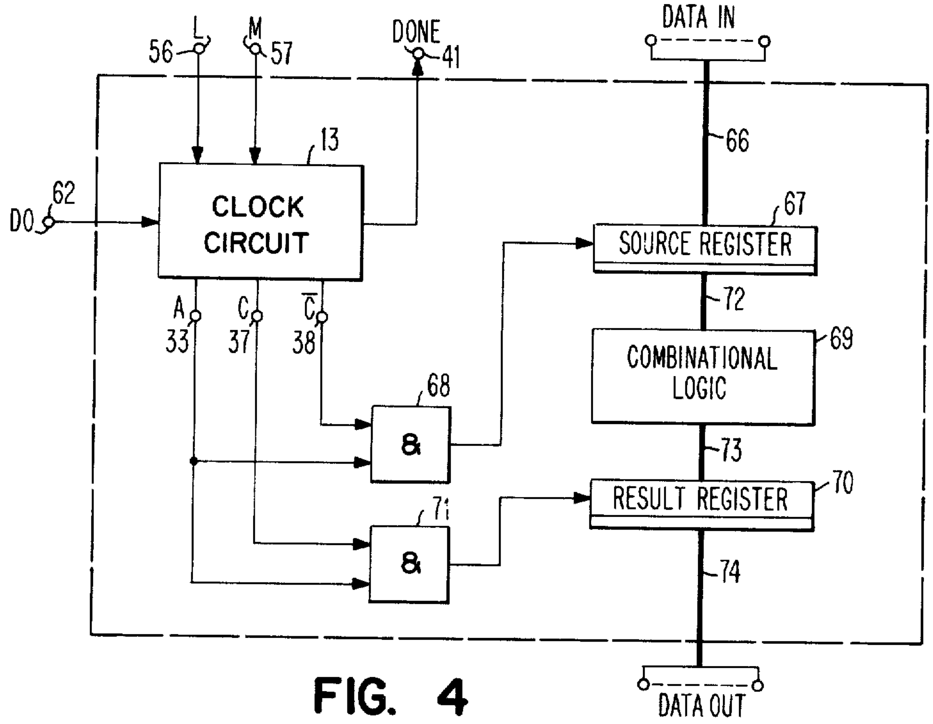
FIG. 4 is a schematic diagram of a remote programmable clock as used in conjunction with a functional logic circuit.

An example of how the clock pulses might be used on a functional logic unit or chip is schematically illustrated in FIG. 4. In this figure, a functional unit 11 is shown with clock circuit 13 thereon along with other functional logic necessary to perform some data processing step. The clock circuit is indicated with the necessary input output terminals for its control with the reference numerals as used in FIG. 2. Only certain of the clocking signals will be used such as A at terminal 33, C at terminal 37 and $\overline{C}$ at terminal 38. The chip has in addition a DATA IN bus which supplies parallel bits of information to a source register 67. When properly controlled by AND gate 68, DATA IN is stored in register 67 and is supplied to the combinational logic indicated generally as 69. At the conclusion of the processing by the logic circuits, the data is stored in a result register 70 controlled through gating circuit 71. The clock circuit upon receipt of a DO signal at terminal 62 proceeds to generate the succession of output signals as described with relation to FIG. 2. Only selected clock signals will be used and the first of these desired signals is the latch A signal at terminal 33 used in combination with the latch $\overline{C}$ at terminal 38. These two signals will be combined in AND circuit 68 to provide an enabling pulse at source register 67 to thereby gate data from DATA IN at terminal 66, thru register 67 to bus 72 into the combinational logic circuits 69. At the conclusion of necessary processing within the logic circuits, data appears on bus 73 and is gated into result register 70 upon the coincidence of latches A and C being on at terminals 33 and 37 to produce an enabling pulse from AND circuit 71 at result register 70. This latter pulse permits the storage of the process data in the register. The data will appear at the Data Output terminals 74 for use in a different chip or functional unit. The energization of AND circuits 68 and 71 are shown in FIG. 3*h* and 3*i*. FIG. 3*j* indicates the time the combinational, logic is given for the performance of its operation. By referring to FIG. 3*g*, it is seen that it may be desirable to increase the delay between the beginning and end of the allotted time in FIG. 3*j* by using a combination of energized L and M lines at terminals 56 and 57 at the clock circuit inputs. This effective added delay would correspond to the anticipated delay requirements contained in combinational logic 69. Note that since the combinational logic 69 and the clock logic 13 are contained on the same functional unit 11 variations in manufacturing parameters will not cause the clock to operate significantly differently than the logic.

Figure 5:
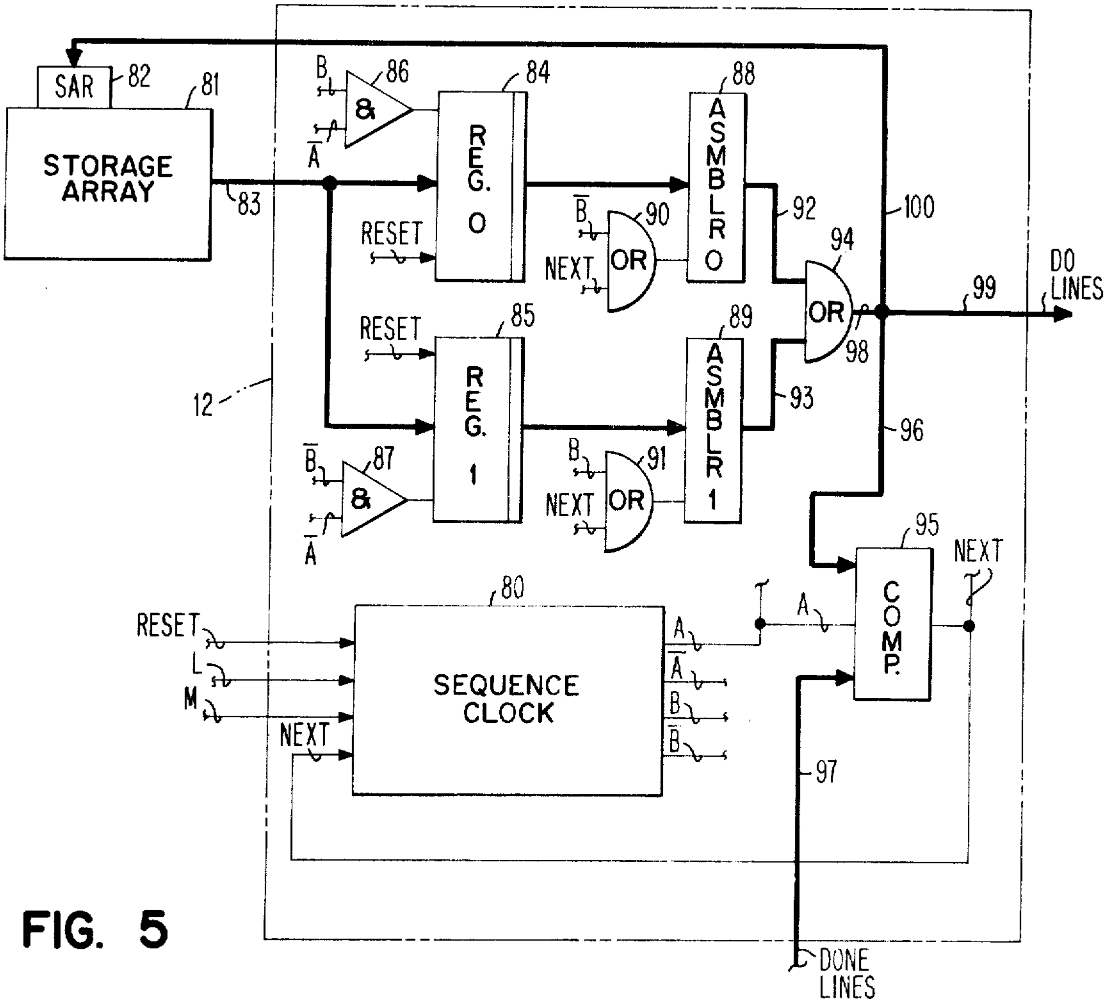
FIG. 5 is a schematic diagram of the central control unit shown in FIG. 1 with which individual clocks are properly timed and sequenced.
Figure 6:
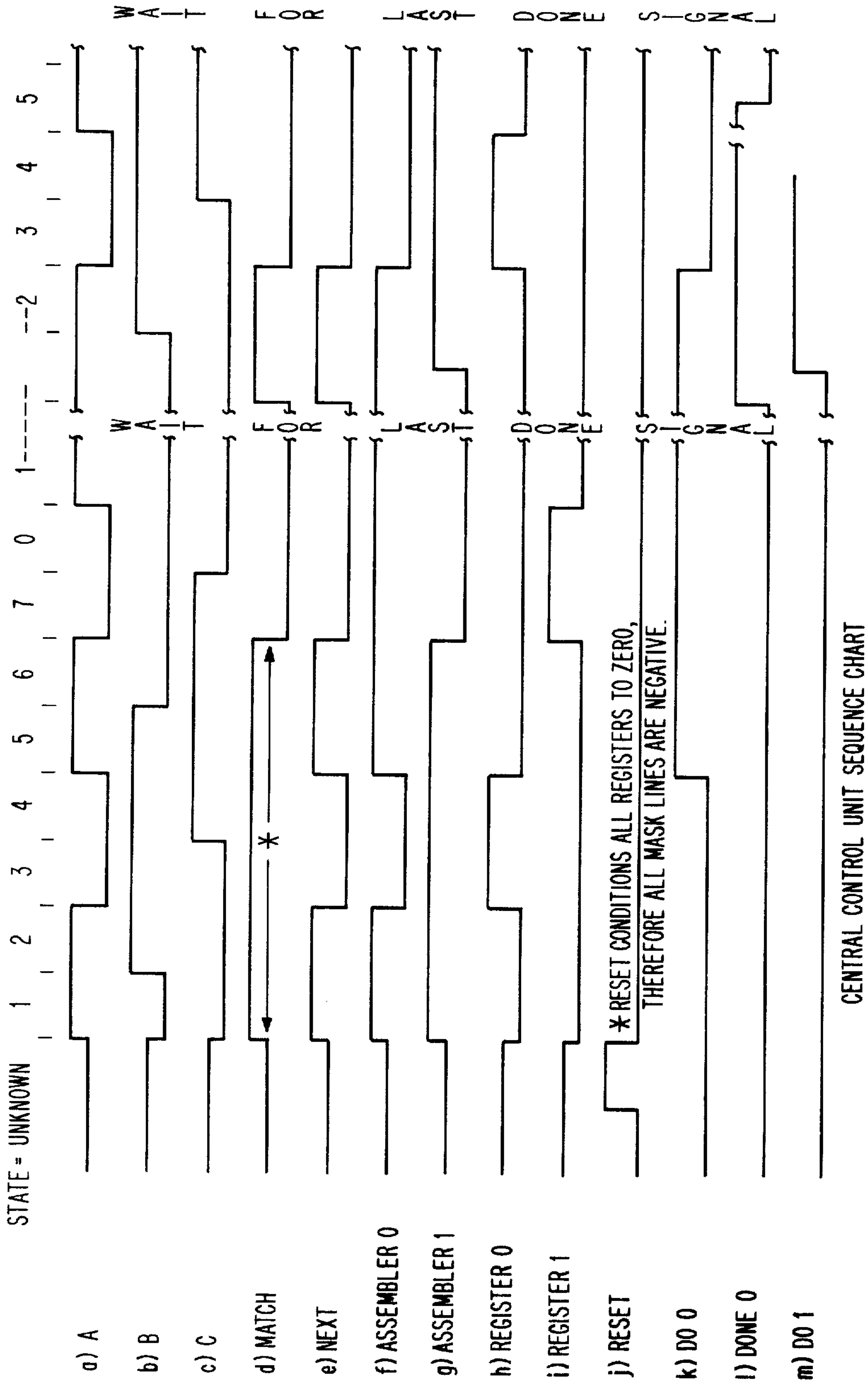
FIG. 6 is a timing diagram for operation of the central control unit shown in FIG. 5.

The central control unit which determines the initiation signals for each of the functional unit clocks will now be described with reference to FIGS. 5 and 6. The central control unit 12 includes several gates, resistors, compare circuits and a sequence clock to maintain the required control. The sequence clock 80 is similar to that described in FIG. 2, except that the circuits are slightly modified: upon reset latch A is always turned on instead of leaving all latches off as indicated at the start of operations in FIG. 3 for clock state 0; the transition from states 1 to 2 and states 5 to 6 depend on a positive NEXT signal indicating the comparison of the DO and $\overline{\text{DONE}}$ signals during normal operation; and the use of $\overline{A}$ and $\overline{B}$ signals to condition resetting of latch C after having been turned on. The reset condition is illustrated in the timing diagram of FIG. 6, waveforms *a*, *b*, *c* and *j*. Clock states in FIG. 6 are shown of equal duration merely for ease of description.

The central control unit 12 is connected to a conventional storage array 81 having a storage address register (SAR) 82 thereon. The storage array is arranged to read out a plurality of binary bits in parallel along cable 83 as input to either 0 Register 84 or 1 Register 85. Information is gated into these registers by respective AND circuits 86 and 87, each controlled by a combination of output signals from sequence clock 80. Control lines are not drawn from the clock output terminals to the gates as diagrammed but the gates are labeled with the appropriate states of the output signals. For example, AND gate 86 requires B latch on and A latch off. Each of the registers 84 and 85 and connected by bus for parallel transfer of data stored therein to respective assemblers 88 and 89. Assembler 88 can be gated by either the latch $\bar{B}$ signal or NEXT signal in an OR circuit 90 while assembler 89 is gated to receive its data through OR circuit 91 when either latch B or the NEXT signals occur.

Each register 84 or 85 (containing all zeros upon reset) and its associated assembler 88 or 89 contains in binary notation with either a zero or one, DO signals, mask data, and the next address for SAR 82. When either of the OR circuits 90 or 91 is activated, the respective assembler provides in parallel a plurality of output signals on bus 92 or 93 to OR circuit 94. A portion of the signals from OR 94 are supplied as DO signals on bus 99. Another portion of the output lines from OR 94 are returned to SAR 82 on bus 100 to cause readout of data at the next address. Each storage word read out contains as part of its information the address of the next stored control word.

A further portion of the parallel output lines from OR circuit 94 carry mask or compare information which is transmitted to compare circuit 95 on bus 96 to appropriately condition a plurality of gates (not shown) within compare circuit 95. There is a gate for each unit clock 13. Also returning to compare circuit 95 in parallel on bus 97 are the DONE lines from the plurality of the clocks 13. A further control gate within compare circuit 90 is one that is conditioned by latch A being on from the sequence clock 80. With the A signal present and a full compare between the mask lines from bus 96 and returning DONE lines from bus 97, a NEXT signal will be generated which is supplied to assemblers 88 and 89 and also to the sequence clock 80 to move the clock through another four states.

Operation of the central control unit is initiated at sequence clock 80 by a negative signal on the reset (DO) line thereto. This turns latch A on, as mentioned above, while latches B and C are off. When latch A is turned on itially, it provides an output to compare circuit 95 which is arranged upon reset to ahve all zeros or negative level signals on the mask lines of bus 96 so that a NEXT signal is generated while latch A is on. (See waveforms a and e of FIG. 6.) The generation of a NEXT signal gates both OR circuits 90 and 91 of assemblers 88 and 89 to cause readout on buses 92 and 93 to OR circuit 94. The transmitted signals are all zeros. The address portion of the readout data of all zeros or negative level signals is transmitted to SAR 82 of control store 81. In the meantime, latch B has been turned on so that both the $\bar{A}$ and $\bar{B}$ are absent. AND gate 87 is blocked. Shortly after latch B turns on, latch A turns off for termination of state 2 of the clock. With latch A off, the NEXT signal is terminated. The $\bar{B}$ signal was terminated earlier and assembler 88 is not conditioned. (See waveforms *a, e* and *f*) However, register 84 through AND gate 86 is fully conditioned to receive the first control word from storage array 81. This word is read in parallel into register 84 where it remains until assembler 88 becomes conditioned later. In the meantime, register 85 is blocked so that it cannot receive a control word from storage.

As clock 80 progresses, latch C turns on and thereafter latch A is again turned on as indicated at clock state 5 in FIG. 6. When latch A is turned on, a NEXT signal is generated from compare circuit 95 since there are still all negative levels at the compare circuit and a NEXT signal is thus automatic. The NEXT signal permits the sequence clock to move through another four states, and also gates assembler 88 at OR circuit 90. This permits the first word of storage to be read out of register 84 into assembler 88 and onto bus 92 through OR circuit 94 onto bus 98. The DO signal portion of bus 98 will initiate operation of the selected remote clocks. Some of the bits of this word from bus 98 are returned to SAR 82 on bus 100 which brings up the address of the second or following control word. When latch A is turned on, AND circuit 86 for register 84 is blocked and the second control word is waiting to be gated into register 85. However, the register is not conditioned until both latches A and B are turned off. (See waveforms *a, b* and *i* for clock states 6 and 7.) With both latches A and B off, AND circuit 87 conditions register 85 for the receipt of the second control word. The word remains in that register until assembler 89 is conditioned either by latch B turning on or at the receipt of a NEXT signal. However, since some clocks have been turned on by the DO lines, there are positive signals sitting on some of the mask lines at compare circuit 95 and no NEXT signal will be generated until receipt of the proper signals from corresponding DONE lines on bus 97. The lack of a NEXT signal prevents further cycling of the clock 80 and the central control unit will remain static until a full compare signal is generated. As shown in FIG. 6, the sequence clock may cycle through state zero and to state 1 where it stops until receipt of a NEXT signal.

When a full compare is noted from circuit 95 a NEXT signal is generated which permits the clock to continue its sequence and also permits assembler 89 to receive data from register 85 due to the gating of OR circuit 91. This action transmits a new set of signal levels to DO lines on bus 99, to SAR 82 on bus 100 and to mask lines on bus 96 for compare circuit 95. When latch A is turned off and latch B turned on, AND circuit 86 for register 84 is conditioned so that the third word from storage can be read into register 84. During this time, register 85 is blocked because of AND gate 87.

It will be noted that sequence clock 80 has two additional input lines for signals L and M. As described above with reference to FIG. 2, either of these signal input lines may be given a positive level signal to increase the time required for the clock to sequence. Whether one or the other or both lines are energized depends on whether there is sufficient time for data to be transferred from storage array 81 into registers 84 and 85 or into assemblers 88 and 89. The L, M lines provide a convenient means for tailoring the clock timing to the requirements of the circuit being controlled by the clock.

While the invention has been particularly shown and described with reference to a preferred embodiment thereof, it will be understood by those skilled in the art that various changes in form and details may be made therein without department from the spirit and scope of the invention.

What is claimed is:

1. Clocking apparatus for controlling circuit timing in a multi-unit data processing system comprising:
   - a plurality of data processing units, each having therein cyclic logic circuits;
   - a clocking circuit in each of said units producing in response to a start signal a predetermined independent series of timing signals to constitute a timing cycle for the logic circuits of its said unit;
   - distributive control means connected to each of said unit clocking circuits operable to generate a start signal for selected ones of said clocking circuits; and
   - signal output means in each said clocking circuit for providing a completion signal upon conclusion of a said predetermined series of timing signals.

2. Apparatus as described in claim 1 wherein said distributive control means provides said start signal simultaneously for each of said clocking circuits to be energized.

3. Apparatus as described in claim 1 further including means in said distributive control means responsive to receipt of a completion signal from each of said clocking circuits already given a start signal for a said timing cycle for initiating a new start signal for the next selected ones of said clocking circuits for another timing cycle.

4. Apparatus as described in claim 1 wherein said clocking circuits each include a plurality of bi-stable circuits for providing said timing signals, each said bi-stable circuit being connected to logical gating means so that each of said bi-stable circuits is dependent for operation upon the occurrence of an output timing signal of at least one other bi-stable circuit at said gating means.

5. Apparatus as described in claim 4 further including a plurality of cascaded delay circuits for producing output delay signals and means connecting the output signals of a preselected one of said bi-stable circuits to the first of said delay circuits to initiate operation of said series of delay circuits, said gating means being connected with said delay circuits and responsive to predetermined ones of said delay signals and said bi-stable output timing signals to provide an initiating signal for another of said bi-stable circuits.

6. Apparatus as described in claim 1 wherein each said data processing unit and clocking circuit therefor occupy a common circuit substrate.

7. Apparatus as described in claim 4 wherein the circuits of each said unit and the said clocking circuit therefor are formed at the same time by the same processes on a common substrate so that the circuits have common operational characteristics.

8. Apparatus as described in claim 1 wherein said distributive control means includes a said clocking circuit means and a variable cycle control means for operating the control means clocking circuit for a partial clock cycle.

9. In a data processing system having logic circuits formed by large scale integration methods on semiconductor chips and having a plurality of chips combined as one or more modules, clocking apparatus comprising:
   - a clocking circuit on selected ones of said chips with each clocking circuit including an input start signal line, an output completion signal line, a plurality of interconnected bi-stable latch circuits, gating means connected to said start line and each of said latch circuits and effective in response to a signal on said start line for sequencing said latch circuits through a series of different logical output states to provide output signals that serve as sequential timing signals for said logic circuits and means connected to said latch circuits and said completion line responsive to a predetermined latch output state for producing an output signal on said completion line at the termination of said series of states; and
   - distributive control means carried by at least one of said modules, connected to said start and completion lines and responsive to an initiating control signal for applying start signals to preselected ones of said start lines and subsequently responsive to said completion signals for applying succeeding start signals to start lines of other selected clocking circuits.

10. Apparatus as described in claim 9 wherein each said clocking circuit further includes:
   - delay circuit means including a plurality of logic elements connected in series to form a delay line with the first of said series being operable in response to an output signal from one of said latch circuits for producing an output delay signal; and
   - delay control means selectively operable to use said output delay signal as a conditioning input to said gating means for another of said bi-stable latches.

11. Clocking apparatus comprising:
   - a first plurality of logic circuits, each adapted to generate an output signal in response to an input signal thereto;
   - a second plurality of logic circuits connected in cascade so that each initiation signal to the first produces a succession of time-spaced delay signals;
   - circuit means connecting the output signal from at least one of said first plurality of logic circuits as a said initiation signal for the first of said second plurality of logic circuits; and
   - gating means combining output signals of selected ones of said first plurality of logic circuits and a selected one of said succession of delay signals to form an input signal to a predetermined one of said first logic circuits to produce a predetermined delay in the sequence of output signals.

12. Apparatus as described in claim 11 further including:
   - means for generating a plurality of different control signals; and
   - selection circuit means connected to said gating means and said delay signals from said second logic means operable in response to one of control signals for selecting a corresponding one of said succession of delay signals for said gating circuit means.

13. Apparatus as described in claim 11 further including means for over-riding said gating means and terminating said output signal sequence of said first plurality of logic circuits.

14. Clock circuit with externally selected delay comprising:

a plurality of bi-stable polarity hold latches adapted to provide clock signals at their outputs;

logical means coupled to the latches for switching the latches in a predetermined sequence through each of a plurality of latch output states;

programmed controlled input lines; and logical means connected to said latch outputs and including a plurality of logic elements connected in cascade to form a delay line and responsive to signals on said input lines for introducing one of a plurality of available delays into the switching sequence.

15. The clock of claim 14 further comprising:

an input DO line adapted to have applied thereto a signal level for initiating said sequence of latch operations;

an output DONE line; and means responsive to the switching of the latches into the final state combination in the sequence for applying an output signal to the DONE line for indicating the termination of the sequence.

16. The clock of claim 15 further comprising:

an additional input line adapted to receive an input signal during some clock sequences, and means responsive to said input signal and to a selected combination of latch states in the sequence for terminating the sequence and for applying an output signal to the DONE line.

* * * * *